Feb. 26, 1957　　A. ROTHGART ET AL　　2,782,686
AUTOMOBILE REARVIEW MIRROR
Filed March 1, 1956
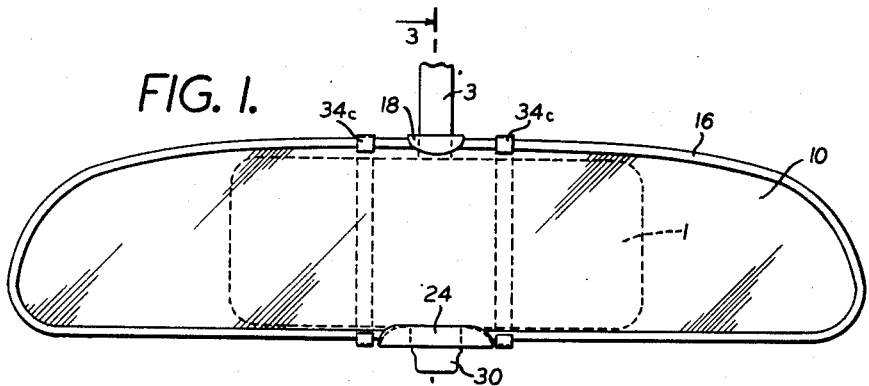
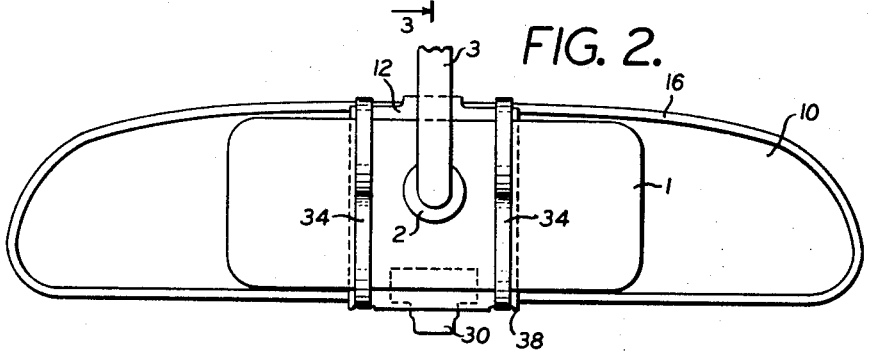
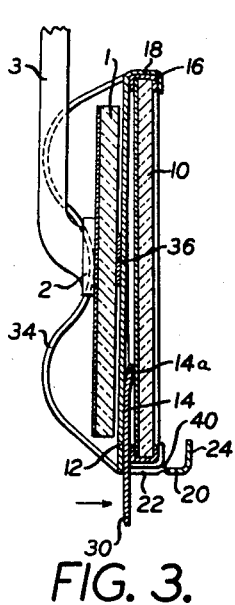
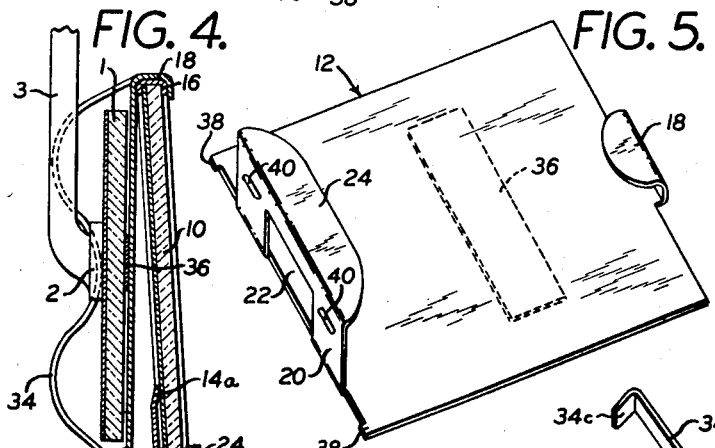
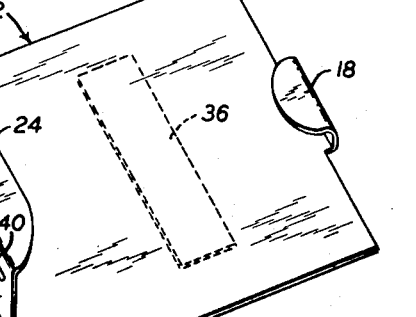
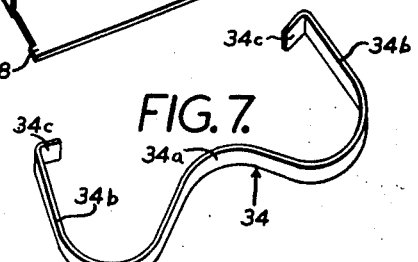
INVENTORS.
ALBERT ROTHGART.
HENRY I. SOBEL.
BY Mock + Blum
ATTORNEYS.

United States Patent Office 2,782,686
Patented Feb. 26, 1957

2,782,686

AUTOMOBILE REARVIEW MIRROR

Albert Rothgart and Henry I. Sobel, Brooklyn, N. Y.

Application March 1, 1956, Serial No. 568,824

1 Claim. (Cl. 88—86)

This invention relates to automobile rear-view mirrors and has particular relation to a rear-view mirror which is movable relative to its mounting and which may be flipped to vary its angle of reflection.

It is an object of the invention to provide a rear-view mirror for the interior of an automobile which may be adjusted to a selected position to permit rearward vision, the mirror being then manually tiltable to avoid reflected glare of headlights behind the automobile.

Another object of the invention is the provision of a rear-view mirror of the type described in which the mirror and its tilting assembly are removably attachable to the conventional rear-view mirror already installed in the automobile, so that no further mounting is required.

A further object of the invention is the provision of a rear-view mirror of the type described which is made of a few simple and inexpensive parts, resulting in convenient and economical manufacture.

Other objects and advantages of the invention will be apparent in the course of the following specification when taken in connection with the accompanying drawings, in which:

Fig. 1 is a front plan view of the mirror of the invention, shown attached to a conventional rear-view mirror;

Fig. 2 is a rear plan view thereof;

Fig. 3 is a section along line 3—3 of Fig. 1;

Fig. 4 is a section similar to Fig. 3, but showing the mirror in tilted position;

Fig. 5 is a perspective view of the mounting plate or bracket for the adjustable mirror;

Fig. 6 is a perspective view of the adjusting piece for the mirror; and

Fig. 7 is a perspective view of one of the clips used for mounting the mirror assembly.

Figs. 1 and 2 show a conventional automobile rear-view mirror 1 which has at its rear surface a socket 2 which is swivelly connected to a stem 3. The stem 3 has at its free end the usual bracket (not shown) or other means for fixed attachment to the interior of an automobile adjacent the top center of the front windshield. By means of the socket 2, the mirror 1 may be adjusted on stem 3 to afford an unobstructed reflection through the rear window of the automobile, so that the driver may observe the traffic behind him. The adjustable mirror assembly of the instant invention is adapted to be secured by spring clips to the body of mirror 1, so that it needs no further attachment means for mounting it within the automobile.

The mirror assembly of the instant invention generally comprises a mirror 10, a bracket on mounting plate 12, and an adjusting piece 14.

The mirror 10 is elongated in the usual manner of interior rear-view mirrors but is longer and wider than the mirror 1, so that it completely covers the mirror 1 in mounted position, and at the same time affords an appreciably wider field of vision to the rear of the automobile. The mirror 10 is bordered by a metal frame 16 to which the other parts of the mirror assembly are secured.

The mounting plate 12 is in the form of a flat metal plate of rectangular form and is approximately the same height as the mirror 10 and its frame 16, at the central portion thereof. At its central top edge, the bracket or plate 12 has an upstanding integral extension bent into channel shape to form an angular hook 18, as is clearly shown in Fig. 5. The central bottom edge of plate 12 has an integral extension piece 20 of elongated rectangular shape which is bent to extend perpendicularly forward of the plate 12. The extension piece 20 contains a rectangular cut-out slot 22, the rear edge of which coincides with the front surface of plate 12. The free forward end of extension piece 20 is bent upwardly to form an upstanding terminal flange 24 which is parallel to and spaced forwardly of the front surface of plate 12.

The adjusting piece 14 comprises a small rectangular metal plate, the lower side portions of which are cut and bent forwardly and upwardly in angular form to provide a pair of spaced hooks 26 and 28. The hooks are separated by a finger piece or tab 30 which is integral with the body of adjusting piece 14 and depends below the bottom edges of hooks 26 and 28.

The plate-like body of adjusting piece 14 is bent approximately at its center along line 32, thus forming a forwardly-inclined top portion 14a.

In forming the mirror assembly, the adjusting piece 14 is mounted centrally at the bottom of mirror 10 by inserting the frame 16 in the channel provided by the hooks 26 and 28, and pressing the legs of said hooks inwardly to provide a press-fit. In this assembled position, the inclined upper portion 14a of adjusting piece 14 abuts and presses against the rear wall of mirror 10, as shown in Figs. 3 and 4, to maintain the adjusting piece 14 immovably secured to the frame of mirror 10.

The mounting plate or bracket 12 is also mounted at the center of mirror 10, as shown in Figs. 1 and 2, with the top section of mirror frame 16 press-fit within the hook 18, and the hooks 26, 28 of the adjusting piece 14 resting upon the horizontal extension piece 20. In this position, the tab 30 of adjusting piece 14 extends through the slot 22 of extension piece 20 and depends a substantial distance below said extension piece 20. The distance between the top hook 18 and the bottom extension piece 20 is such that the mirror is pressed snugly therebetween.

A pair of identical spring clips 34 are provided for mounting the mirror assembly over a conventional rear-view miror. Each clip 34 is made of a single piece of flat spring metal bent to form a bowed central section 34a, and a pair of planar side arms 34b, each terminating in an inwardly bent leg 34c.

In mounting the mirror assembly, the mirror 11 is placed in front of the installed conventional mirror 1 with the rear surface of mounting plate 12 resting flush against the front surface of mirror 1. The spring clips 34 are then attached in the manner shown in Figs. 2 and 3, that is, the legs 34c are hooked over the top of mirror frame 16 and over the bottom edge of mounting plate 12, the clips extending vertically behind the mirror 1. In this position, the bowed central portion 34a of clips 34 press against the rear surface of mirror 1, and the resilience of metal clips 34 maintains the mirror assembly pressed firmly against the mirror 1. To prevent slipping of the mirror assembly relative to the mirror 1, a strip 36 of tacky plastic such as flexible vinyl sheeting may be cemented to the rear surface of mounting plate 12. When the clips 34 are applied, the strip of plastic 36 is pressed against the front surface of mirror 1, its tackiness causes the strip 36 to stick to the mirror 1, thereby preventing slipping of the mirror assembly even under road shock and vibration.

For purposes of holding the clips 34 from slipping out of their mounted positions, the mounting plate 12 may be provided with depending legs or projections 38 at each side of its bottom wall. The bottom terminal legs 34c of clips 34 fit between these projections 38 and the extension piece 30 of the plate 12. The projections 38 therefore cooperate with the extension piece 30 to form a seat for the lower ends of clips 34, preventing said clips from slipping or sliding laterally.

When the mirror assembly is mounted on the installed mirror 1, as heretofore described, the mirror 10 completely covers the mirror 1. The mirror assembly may be adjusted in the usual manner to enable the driver to see a reflected view through the rear window of the automobile, by tilting the mirror 1 and its attached mirror assembly by means of the socket 2. This is done while the mirror 10 is in its normal non-tilted position in the mirror assembly, as shown in Fig. 3, that is, with the mirror 10 substantially parallel to the mounting plate 12, and the adjusting piece 14 abutting the rear wall of the slot 22.

When driving at night, the driver is often annoyed by headlights of automobiles following him, the light from such headlights being reflected in the rear-view mirror to his eyes. In addition to being annoying, such reflection can be dangerous. The mirror assembly is so constructed that the mirror 10 can be quickly "flipped" or tilted relative to the mirror 1 and the mounting plate 12 to raise the reflected light of the headlights, while at the same time leaving the initially adjusted position of the mirror assembly unaffected.

To tilt the mriror 10 in the mirror assembly, the tab 30 of adjusting piece 14 is grasped by the driver and pulled forwardly until it is adjacent the front of slot 22 and until the hooks 26 and 28 of adjusting piece 14 engage and are stopped by the upstanding terminal flange 24 of extension piece 20. In this position, shown in Fig. 4, the mirror 10 is tilted slightly upwardly relative to mounting plate 12 and mirror 1. In its initially adjusted position, the mirror assembly is tilted downwardly so that the driver looking upwardly can see therein the reflection of the road behind the automobile. When the mirror 10 is tilted by means of adjusting piece 30 it is brought to a more vertical position, giving the driver a more elevated view to the rear and avoiding the reflection of headlights behind the automobile.

When the headlights behind the automobile are no longer present, the driver merely presses the tab 30 to the rear of slot 22, thereby bringing the mirror 10 back to its normal position of Fig. 3 to again provide a normal view of the road. It will be observed that this selective positioning of the mirror 10 between its tilted and non-titled positions, is performed without affecting the initial adjustment of the mirror assembly relative to the stem 3.

The extension piece 20 is provided with a pair of upwardly pressed-out ribs 40 on either side of the slot 22, the ribs 40 serving as detents to lock the mirror 10 in its tilted position.

While a preferred embodiment of the invention has been shown and described herein, it is obvious that numerous omissions, changes and additions may be made in the invention without departing from the spirit and scope thereof.

What is claimed is:

A mirror assembly for attachment to an installed automobile rear-vision mirror, said assembly comprising a mounting plate having an integral top hook and a bottom extension extending perpendicularly forwardly thereof and terminating in an upturned flange, said extension having a slot therein, a mirror mounted on the front face of said mounting plate, the top end of said mirror being held by said hook and the bottom end thereof resting upon said extension, said mirror having a depending adjusting piece secured to the bottom end thereof, said adjusting piece having a tab extending through the slot in said extension, a strip of tacky plastic secured to the rear surface of said mounting plate, and means including a pair of spring clips for attaching said mounting plate immovably to the front of said installed automobile mirror, said spring clips then resiliently urging said mounting plate and the installed rear-view mirror in flush abutting engagement, said plastic strip adhering to the face of the installed rear-view mirror by pressure of said spring clips, said tab being movable back and forth in said slot to move the lower end of said mirror relative to said mounting plate along said bottom extension between a normal position in which the mirror is substantially parallel to the mounting plate and a tilted position in which the mirror is upwardly tilted at an angle to said mounting plate, the upturned flange of said bottom extension serving as top means to limit the forward movement of the lower end of said mirror.

References Cited in the file of this patent
UNITED STATES PATENTS

| | | |
|---|---|---|
| 2,165,771 | Vlasak | July 11, 1939 |
| 2,420,259 | McNamara | May 6, 1947 |

FOREIGN PATENTS

| | | |
|---|---|---|
| 1,000,125 | France | Oct. 10, 1951 |